(12) United States Patent
Glasner et al.

(10) Patent No.: US 6,454,857 B1
(45) Date of Patent: Sep. 24, 2002

(54) APPARATUS AND METHOD FOR THE CLEANING AND/OR COATING OF THE MOLD SURFACE OF A MOLD

(75) Inventors: Peter Glasner, Mühlheim/Main (DE); Günther Willi Hartmann, Rüsselsheim (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 43 days.

(21) Appl. No.: 09/621,211

(22) Filed: Jul. 21, 2000

(51) Int. Cl.[7] .............................. B05B 13/06; B08B 9/04
(52) U.S. Cl. ................ 118/306; 118/317; 118/DIG. 10; 134/8
(58) Field of Search .................................. 118/306, 317, 118/305, DIG. 10; 134/6, 7, 8, 24, 167 R; 451/38, 39, 75; 239/264, 265

(56) References Cited

U.S. PATENT DOCUMENTS 2,479,299 A * 8/1949 Biggs et al. ................... 451/75
5,932,026 A * 8/1999 Trampusch ..................... 134/7

* cited by examiner

*Primary Examiner*—Richard Crispino
*Assistant Examiner*—Yewebdar T Tadesse
(74) *Attorney, Agent, or Firm*—David L. King

(57) ABSTRACT

The invention relates to an apparatus for the cleaning and/or coating of a mold surface of a mold. The apparatus has a frame which can be placed onto the mold and in which a handling device is movable along a predetermined track in such a way that at least one cleaning or coating unit provided on the handling unit, of which the relative position is adjustable relative to the mold surface, is moved past the mold surface at a predetermined spacing to carry out the cleaning or coating process. A drive means is provided for the adjustment of the relative position of the cleaning or coating unit and can be coupled to the handling device, but is decoupled from the handling device during the movement thereof.

19 Claims, 7 Drawing Sheets

APPARATUS AND METHOD FOR THE CLEANING AND/OR COATING OF THE MOLD SURFACE OF A MOLD

The invention relates to an apparatus for the cleaning and/or coating of a mold surface of a mold, in particular of the mold surface of a vulcanization mold for the manufacture of tires, comprising a frame which can be placed onto the mold and in which a handling device is movable along a predetermined track in such a way that at least one cleaning or coating unit is provided on the handling unit of which the relative position is adjustable relative to the mold surface, is moved past the mold surface at a predetermined spacing for the cleaning or coating, and further comprising a drive means for the adjustment of the position of the cleaning or coating unit. Furthermore, the invention relates to a method for the cleaning and/or coating of a mold surface of a mold.

The apparatus and method for the cleaning of the mold surface of a mold, in particular the mold surface of a vulcanization mold for the manufacture of tires, is known from DE 197 12 513 A1. In this apparatus a frame in which a five-axes robot is movable as a handling unit along a circular track is inserted between the part molds of the mold which can be moved apart. A nozzle for dry ice pellets is provided at the free end of the robot, and the relative position of the nozzle relative to the mold surface can be set with the aid of the robot. After the relative position has been set, the total robot, which is secured on a rotatable ring, is moved circularly, with the dry ice pellets which emerge from the nozzle cleaning the mold surface.

In this known apparatus the problem exists that as a result of the use of the robot, which takes up a lot of constructional volume as a consequence of its design, the frame must be of correspondingly large dimensions, so that the mold parts mold must be moved correspondingly far apart. Furthermore, the programming of the five-axis robot is very time and cost intensive as a result of the complex movements of the different axes, which must be coordinated with one another. A further problem in the known apparatus resides in the fact that it is exposed to high temperatures when used for the cleaning of vulcanization molds since the molds are cleaned during the running operation and consequently only cool down a little. This has the consequence that both the sensitive electronics, the drives and also the mechanical bearing points of the robot are exposed to correspondingly high operating temperatures through which their orderly operation can be disturbed. Finally, the drive with which the robot is moved in the frame must be laid out to be correspondingly powerful as a result of the masses which the robot and its drive components have, which have to be moved and braked. It is the object of the invention to so further develop the apparatus and method of the initially named kind that the handling apparatus can be programmed without great effort and an orderly operation of the handling device is possible even at high environmental temperatures.

SUMMARY OF THE INVENTION

The invention is satisfied by an apparatus having the following features. An apparatus for the cleaning and/or coating of a mold surface of a mold, in particular of the mold surface of a vulcanization mold for the manufacture of tires. The apparatus has a frame which can be placed onto the mold and in which a handling device is movable along a predetermined track in such a way that at least one cleaning or coating unit is provided on the handling device, of which the relative position is adjustable relative to the mold surface. The at least one cleaning or coating units is moved past the mold surface at a predetermined spacing for the cleaning or coating.

The apparatus further has a drive means for the adjustment of the position of the cleaning or coating unit, wherein the drive means coupled to the handling device for the adjustment of the relative position of the cleaning or coating unit is decoupled from the handling device, at least during the movement of the handling device along the predetermined track, with the cleaning or coating unit retaining its relative position with respect to the mold surface previously set by the drive device. Furthermore, the object is satisfied by a method having the following features. A method for the coating or cleaning of the mold surface of a mold, in particular of the mold surface of a vulcanization mold for the production of tires, in which a frame is positioned onto the mold, in which the relative position of a cleaning and/or coating unit held on a handling device movable along a predetermined track in the frame is subsequently adjusted with the aid of a drive means and thereafter the handling device is moved along the predetermined track, with the cleaning or coating unit being moved in its adjusted position past the mold surface for the cleaning or coating respectively. The drive means is uncoupled from the handling device after the relative position of the cleaning or coating device has been adjusted. The handling device is then subsequently moved along the predetermined track and is coupled again to the drive means for renewed setting of the relative position of the cleaning or coating unit.

In the invention the drive means is decoupled from the handling device during the movement of the handling device, while it is connected to the handling device at least during the adjustment of the cleaning or coating unit. The drive means is consequently not co-moved during the movement of the handling device in the frame, so that the drive which moves the handling device can be made correspondingly small. Furthermore, the constructional space required in the frame for the handling device is smaller in the apparatus of the invention than in the known apparatus, since the drive device which can be decoupled from the handling device need not be directly arranged in the inner space surrounded by the frame. Since the cleaning or coating unit retains its relative position previously set by the drive device with respect to the mold surface, even when the drive means is decoupled, a follow-up regulation of the position of the cleaning or coating unit during the movement of the handling device is not required, so that, on the one hand, the control complexity is smaller and, on the other hand, sensitive control modules and sensors which could be impaired in their manner of operation through the high temperatures, in particular during the cleaning of vulcanization molds, do not have to be provided at the handling device.

Further advantageous developments of the invention can be seen from the subsequent description, the drawing and also the subordinate claims. Thus, it is proposed that the handling device should be provided with a braking unit which locks the cleaning or coating unit in its relative position after the adjustment. In this way a situation is achieved in which the relative position of the cleaning or coating unit is also not misadjusted with a jolt-like movement of the handling device.

Furthermore, it is proposed that a self-locking positioning unit which is coupled with the drive means for the adjustment should be provided at the handling device, in addition to, or as an alternative to, the locking of the relative position of the cleaning or coating unit. In this embodiment the self-locking of the positioning unit also achieves a situation in which the position of the cleaning or coating unit does not change during the movement of the handling device.

In a preferred embodiment of the apparatus the drive means for the adjustment of the cleaning or coating unit is held on a carriage which is movable between a rest position, in which the drive means is spaced from the handling device, and a coupling position, in which the drive means is coupled to the handling device. With the aid of the carriage a rapid coupling on and decoupling of the drive means to or from the handling device is made possible, with the drive means being spaced from the frame when the carriage is moved into its rest position so that it is protected from high temperatures.

The handling device preferably has an attachment unit with which it is held on a rotating ring, which is rotatably mounted in the frame about an axis of rotation. During the cleaning or coating the frame is aligned relative to the mold so that the axis of rotation coincides with the axis of symmetry of the mold which is to be cleaned. Through the use of a rotatable ring, the handling device moves on a circular track, so that the handling device is particularly suited for rotationally symmetrical molds in particular, such as are, for example, used in the manufacture of motor vehicle tires.

As an alternative it is proposed that the attachment unit of the handling means should be guided in a guide provided at the frame, which forms a closed surrounding contour. In this embodiment the contour can, for example, extend in the shape of an oval, a rectangle or a polygon, so that molds with correspondingly designed mold surfaces can be cleaned or coated.

A telescopic arm which is pivotally mounted on the attachment unit is proposed as the handling device, with the pivotal position and length being adjustable with the aid of the drive means and with the cleaning or coating unit being held at the free end of the telescopic arm remote from the attachment unit. Through the use of a telescopic arm, an exact and positionally accurate setting of the position of the cleaning or coating unit can be effected without substantial technical control complexity.

In order to enable the most accurate possible alignment of the cleaning or coating unit relative to the mold surface, it is furthermore proposed that the cleaning or coating unit should be pivotally mounted on the handling device, i.e. on the telescopic arm, with the pivotal position being adjustable here with the aid of the drive means.

In a particularly preferred embodiment of the apparatus of the invention, a centering unit is additionally provided at the frame with which the frame can be aligned with respect to the mold which is to be cleaned or coated. A centering ring which is, for example, rotatably mounted on the frame, is, for example, suitable as the centering unit, with the centering ring standing in a co-operative connection with at least one lever which is pivotably mounted in the frame, such that, with one turn of the centering ring in a first direction, the lever comes into contact with the mold for alignment and, with a rotation of the centering ring in a second direction opposite to the first direction, the lever is moved away from the frame. With the aid of the centering unit the frame can be aligned in a defined position relative to the mold once it has been placed onto the mold, so that the cleaning or coating unit is moved past the mold surface during movement of the handling device without large fluctuations of the predetermined spacing.

Since correspondingly high noise emissions arise, in particular when cleaning the mold with dry ice or laser beams, it is furthermore proposed that the housing should be provided with a sound insulating jacket which at least partly surrounds the range of movement of the handling device.

The previously described apparatus can be used for the cleaning of one piece and also multi-piece molds. It is particularly suitable for the cleaning of a mold which is formed from at least two-part molds, with the part molds preferably being moveable apart from one another in an axial direction. For the cleaning or coating, the frame is moved between the part molds that should be moved apart and onto the part mold which is to be cleaned. Furthermore, the part molds can be moved together again after the insertion of the frame, with the frame being lightly clamped between the part molds. In this manner it is possible to clean or coat first the one and subsequently the second part mold in one cleaning or coating process.

If the apparatus is used for the cleaning or coating of a vulcanization mold, then it is furthermore proposed that the vulcanization mold should be kept at a temperature in a range of 140 to 175° C., preferably in a range from 155 to 160° C. In this way a situation is achieved in which the vulcanization mold can be directly used again for vulcanization after cleaning or coating, without the mold having to be heated up to its operating temperature again.

BRIEF DESCRIPTION OF THE DRAWINGS

In the following the invention will be explained in more detail with reference to an embodiment and to the drawings, in which are shown.

DETAILED DESCRIPTION OF THE INVENTION

Figure 1:
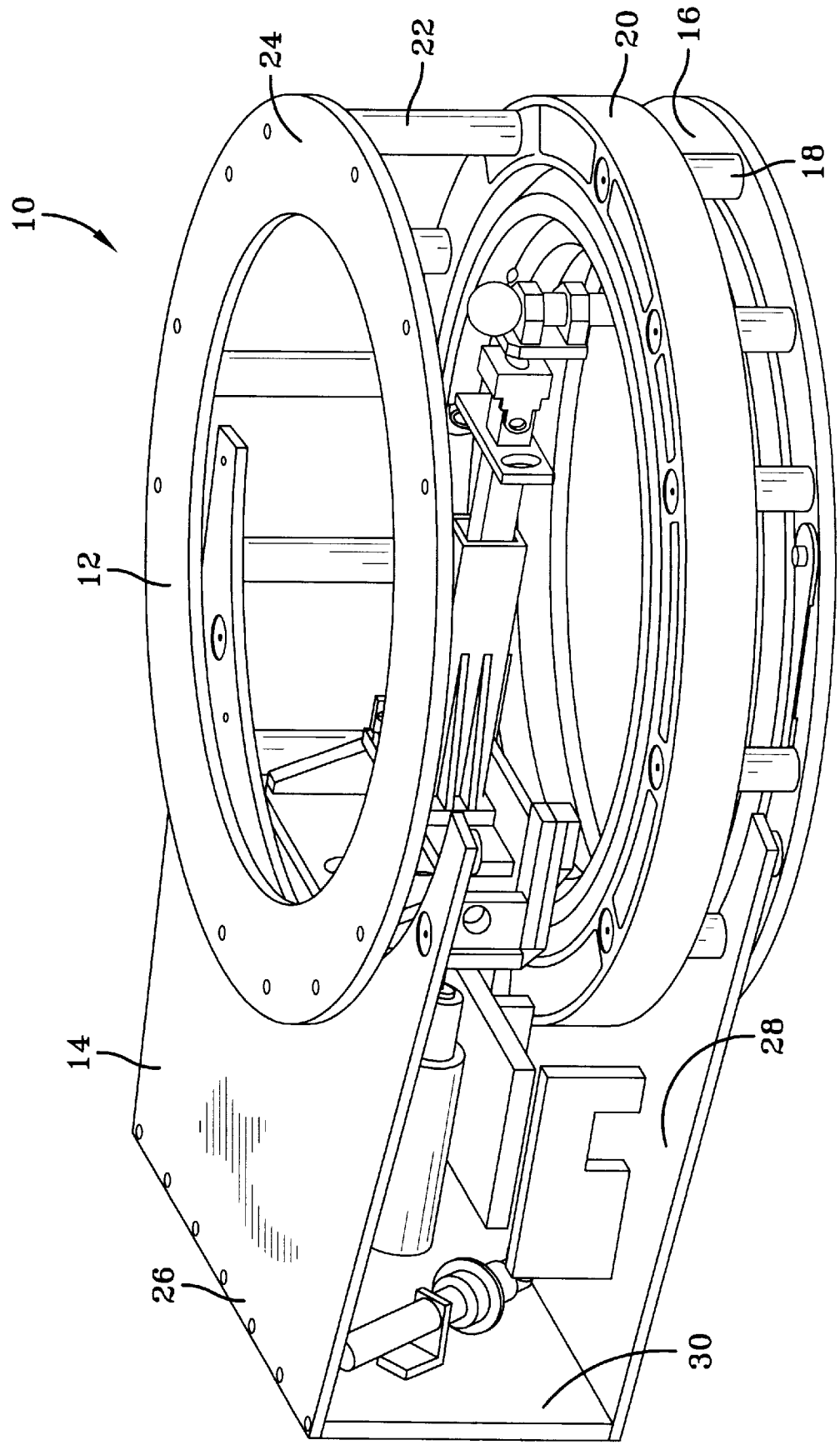
FIG. 1 a perspective illustration of an apparatus in accordance with the invention for the cleaning of a vulcanization mold.

FIG. 1 shows in a perspective illustration an apparatus 10 for the cleaning of molds, in particular of vulcanization molds. The apparatus 10 can also be used with a corresponding change of design for the coating of the molds, with a coating pistol being used in place of a cleaning pistol. The apparatus 10 has a frame 12 and a housing 14 which projects radially outwardly and is secured to the frame 12 and shown at the left in FIG. 1, with which the apparatus 10 can be coupled onto a preferably movable lifting device (not shown). Both the frame 12 and also the housing 14 are surrounded by a sound insulating jacket (not shown), which reduces the noise emissions which arise during cleaning to a level which is bearable for humans.

The frame 12 has a support ring 16 shown at the bottom in FIG. 1 and a plurality of identical spacers 18 stand perpendicularly upwardly from the top surface of the support ring in the same direction. The spacers 18 support a bearing ring 20, which is fixedly screwed to the spacers 18 and the purpose of which will be explained later. A second spacer 22 stands vertically upwardly at each mounting point of the bearing ring 20 to the spacers 18. The spacers 22, which are similar to the spacers 18 have, however, a greater length and support a contacting ring 24 which is fixedly connected to the spacers 22 and forms the top side of the frame. The housing 14 is formed from a top side 26, a bottom side 28 and also a side end 30, with the side end 30 being designed for coupling onto the lifting means. The sides 26 and 28, which are identically formed in their dimensions, are approximately trapezoidal and each has an approximately circular cut-out at its side edges facing the frame 12, with the radius of the circular cut-out corresponding approximately to the radius of the inner diameter of the support ring 16 and of the contacting ring 24 respectively. The top side 26 and the bottom side 28 of the housing 14 are so secured to the frame 12, with the aid of the spacers 18 and 22 and also additional attachment elements which are not shown, that the frame 12 and the housing 14 form a self-supporting design.

Figure 2:
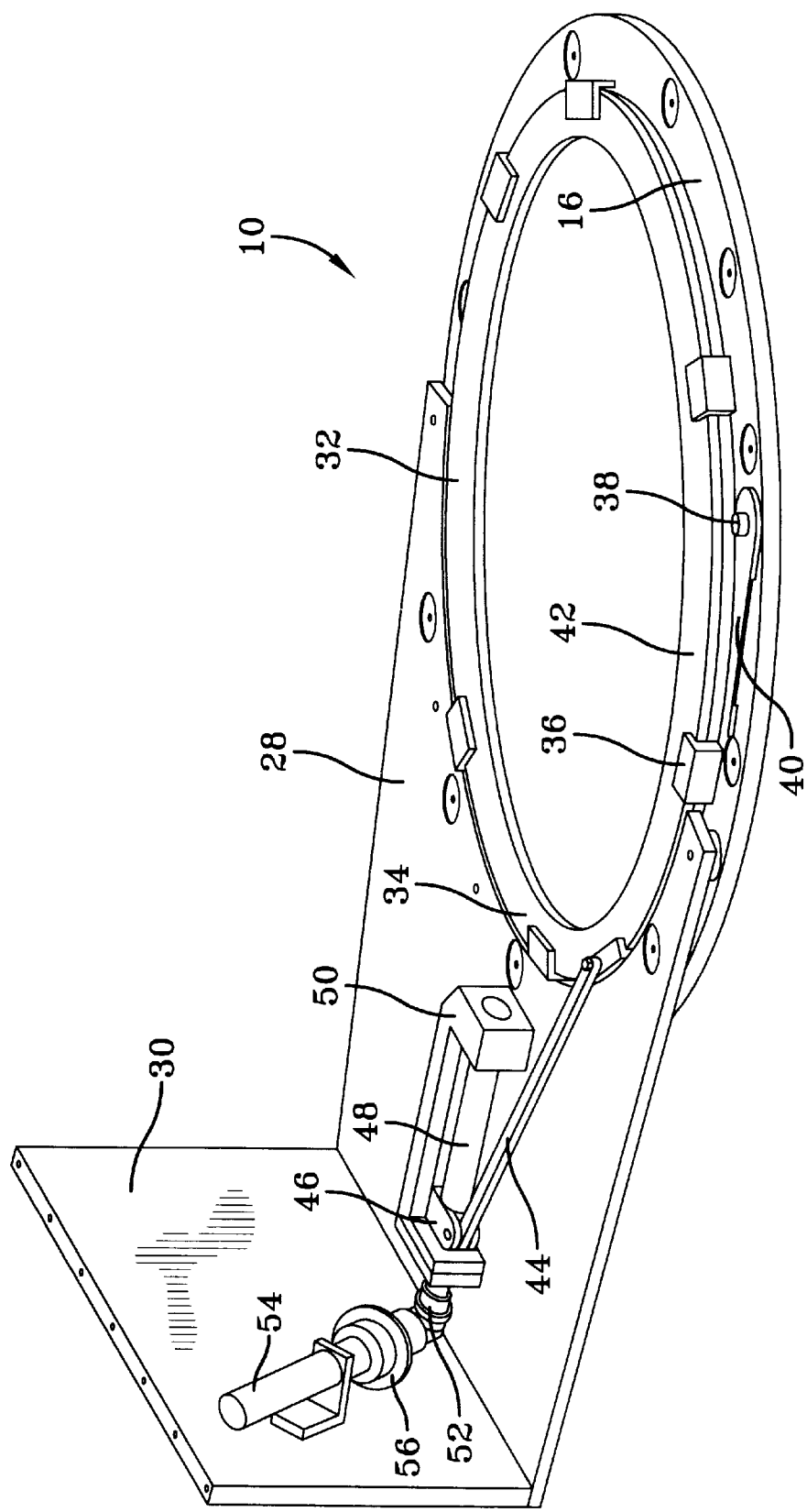
FIG. 2 a perspective illustration of the apparatus of FIG. 1 showing only one centering device as provided.

A centering device 32 is provided on the support ring 16 shown at the bottom in FIG. 1 and will be explained in more detail in the following with reference to FIG. 2. The centering device 32 has a centering ring 34 arranged concentric to the support ring 16, with the centering ring 34 being rotatably mounted in a total of six bearing jaws, and having a small spacing from the upper side of the support ring 16. The bearing jaws 36 are respectively combined into pairs, with the pairs being secured to the support ring 16 with a uniform spacing around the circumference. Between each pair of bearing jaws 36, there is provided a lever 38 which is pivotally mounted on the support ring 16 and projects into the gap formed between the support ring 16 and the centering ring 34, with the lower side of the centering ring 34 being supported on the lever 38. A positioning groove 40 is formed in the longitudinal direction of each of the three levers 38, and a spigot 42 which projects from the lower side of the centering ring 34 stands in engagement with the positioning groove.

One end of a push-rod 44 is pivotally connected to the centering ring 34 between the two pairs of bearing jaws 36, close to the underside 28 of the housing 14. The other end of the push-rod 44 is pivotally connected to a spindle nut 46, which stands in engagement with a spindle 48 of a spindle drive 50 secured to the bottom side 28. The spindle 48 of the spindle drive 50 is connected by a bevel gear 52 to the drive shaft of an air motor 54, with a torque limiter 56 being provided between the bevel gear 56 and the drive shaft of the air motor 54. An electric drive, such as for example a positioning motor or stepping motor, with which the spindle drive 50 can be actuated, is also suitable in place of the air motor 54.

For the centering of the frame 12 at the mold to be cleaned, the frame 12 is threaded by the lifting device onto the lower part mold (not shown) of the mold, so that it projects through the central opening of the support ring 16. Thereafter, the air motor 54 is actuated and drives the spindle 48 to rotate the spindle drive 50. By the rotation of the spindle 48, the spindle nut 46 is moved in the longitudinal direction of the spindle 48, with the push-rod 44 transmitting the movement of the spindle nut 46 to the centering ring 34. The centering ring 34 is rotated during this in a first direction of rotation (in the counter-clockwise sense in FIG. 2), with the pivotally mounted lever 38 being pivoted towards the inside by the spigots 42 of the centering ring 34, which stand in engagement with the positioning grooves 40. During this the levers 38 come into contact at their ends remote from the mounting point with the preferably rotationally symmetrical, circumferential surface of the part mold. Through the uniform movement of the levers 38 the frame 12 is aligned by the levers 38 contacting the circumferential surface so that the support ring 16 is arranged with its central opening at least approximately concentric to the lower part mold. As soon as the levers 38 contact the circumferential surface of the part mold with a predetermined force, the torque limiter 56 switches off the air motor 54, whereby the centering process is terminated. The support ring 16 is kept in its aligned position with the aid of the levers 38 contacting the part mold until the cleaning process is concluded. After the cleaning the air motor 54 is activated anew and rotates the centering ring 34 in the opposite direction of rotation to the first direction of rotation, whereby the levers 38 of the support ring 16 are pivoted back into their starting positions shown in FIG. 2 in which they are moved out of the central opening of the support ring 16.

Figure 3:
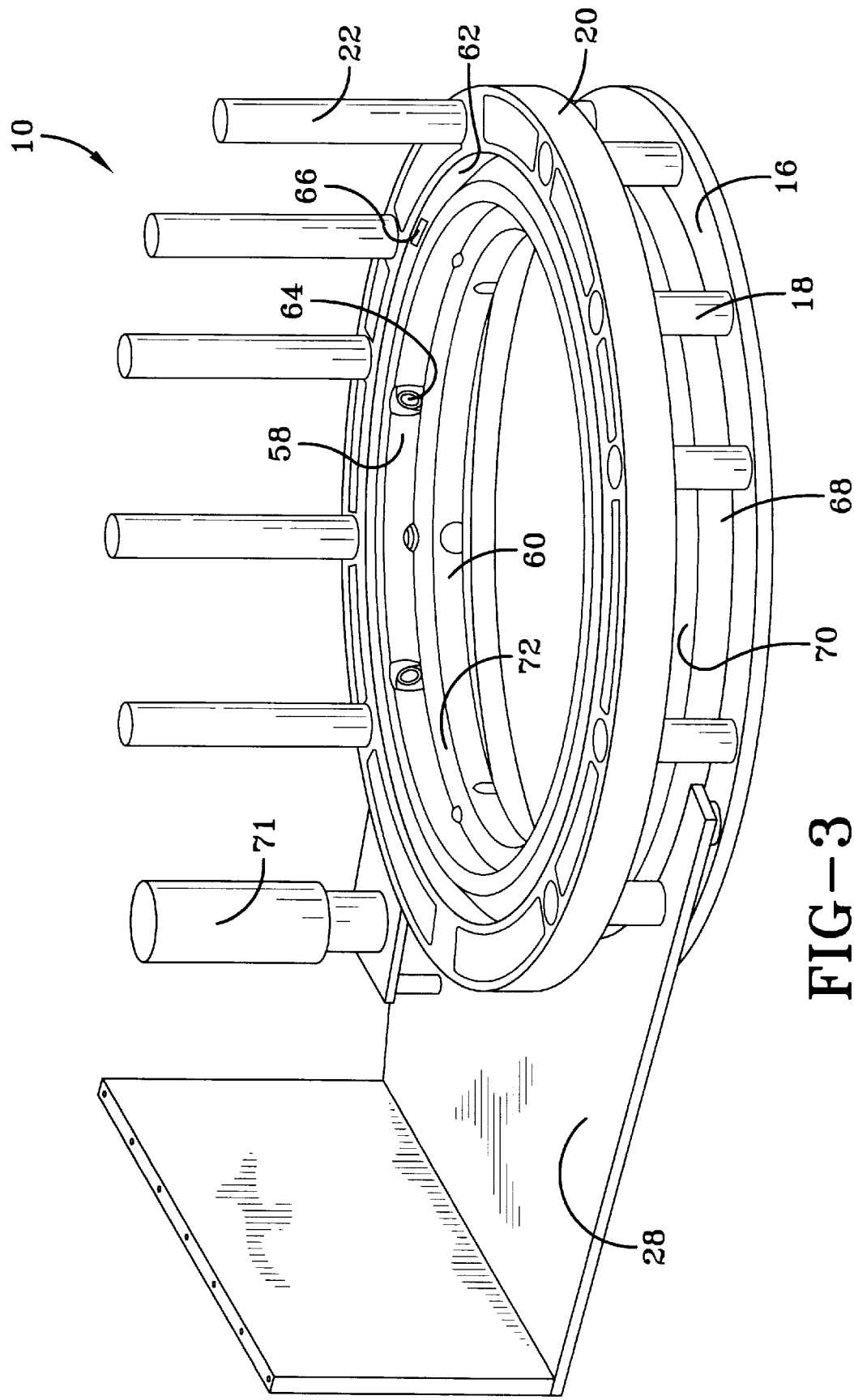
FIG. 3 a perspective illustration of the apparatus of FIG. 1 showing only one rotary mounting of the handling device.

FIG. 3 shows a rotary mount 58 provided in the apparatus 10. The rotary mount 58 has a rotatable ring 60 which is rotatably mounted on the bearing ring 20. For this purpose a radially inwardly projecting bearing collar 62 is formed on the bearing ring 20 and has two bearing surfaces which extend inclined to one another at an angle. Six bearing rollers 64 are rotatably mounted distributed uniformly around the circumference and are supported on the underside of the bearing collar 62. Furthermore, six bearing rollers 66 are provided symmetrically between the bearing rollers 64 and are supported on the upper side of the bearing collar 62, so that the rotatable ring 60 is uniformly held in the bearing ring 20.

A projection 68 extends from the underside of the rotatable ring 60 facing the support ring 16 and projects through the bearing ring 20, with a toothed arrangement for a toothed belt 70 being formed at the outer circumferential surface of the projection 68. The toothed belt 70 in turn engages with a drive pinion of a drive motor 71 secured to the bottom side 28 of the housing 14. With the aid of the drive motor 71, the rotatable ring 60 can be turned to and fro in the clockwise sense or in the counter-clockwise sense of FIG. 1 in the bearing ring 20. At its inner circumferential surface, the rotatable ring 60 has a support step or shoulder 72, which serves for the attachment of a handling device 74, which will be subsequently explained in more detail with reference to the FIGS. 4 to 6.

Figure 4:
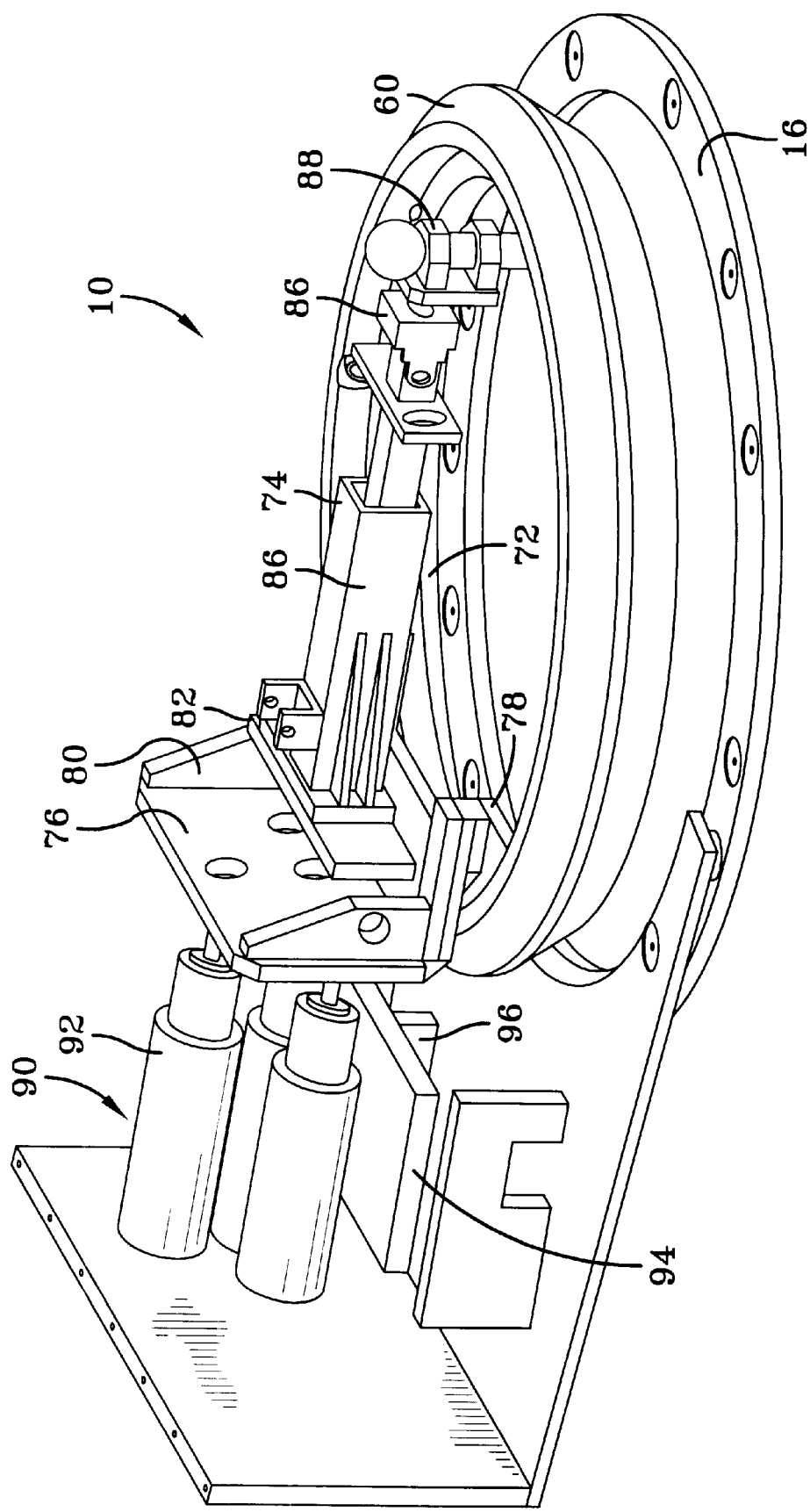
FIG. 4 a perspective illustration of the apparatus of FIG. 1 in which the handling device mounted on the rotatably journalled rotatable ring is shown in its rest position.

As FIG. 4 shows, the handling device 74 has an attachment plate 76, which is fixedly connected to the rotatable ring 60 by a holder 78, with the holder 78 being supported, amongst other things, on the support step 72. The flat side of the attachment plate 76 extends at least approximately parallel to the direction of the axis of rotation of the rotatable ring 60. Two identically formed bearing brackets 80 project from the front side of the attachment plate 76 facing the frame 12, close to the two side edges, and a pivoting plate 82 is pivotally mounted on the bearing brackets. A telescopic arm 84 is secured at the center of the pivoting plate 82 and extends in the radial direction into the frame 12. A pivotal mount 86, with which a cleaning pistol 88 is pivotally mounted on the telescopic arm 84, is provided at the free end of the telescopic arm 84 remote from the attachment plate 76. Both the pivotal position and also the length of the telescopic arm 84 are adjusted with the aid of self-locking threaded spindles (not shown). The pivotal position of the cleaning pistol 88 is likewise set by a self-locking threaded spindle (not shown).

A drive device 90 is further received in the housing 14 for the adjustment of the threaded spindle for the cleaning pistol 88 and for the threaded spindles for the telescopic arm 84. The drive device 90 is coupled, for the adjustment of the pivotal position of the cleaning pistol 88 and of the pivotal position of the telescopic arm 84 and also for the adjustment of its length to the threaded spindles, as will be explained in the following. The drive means 90 has a total of four servomotors 92, which are jointly secured on a carriage 94. The carriage 94 is displaceably mounted on a guide 96 secured to the bottom side 28 of the housing 14 and can be moved in the radial direction with respect to the rotatable ring 60 between a rest position in which it is spaced from the rotatable ring 60 and a coupling position in which it is moved towards the rotatable ring 60.

The coupling process and the adjustment of the handling device 74 will be explained in more detail in the following with reference to FIG. 5 in which the coupling position between one of the servomotors 92 and one of the threaded spindles 98 of the handling device 74 is schematically illustrated. To the end face of the drive shaft of each servomotor 92 there is secured a coupling element 100 which is a component of a releasable coupling device 102, by means of which the respective servomotor 92 can be coupled to the threaded spindle 98 associated with it. The respective threaded spindle 98 has in turn a coupling element 104 of the coupling device 102 at its end confronting the servomotor 92, which can be coupled to the coupling element 100 of the respective servomotor 92. The threaded spindle 98 is rotatably mounted in a bearing aperture 105 in the attachment plate 76 and extends in the direction of the telescopic arm 84, at which it co-operates in known manner with the positioning devices of the telescopic arm 84 and of the pivotal mount 86.

Figure 5:
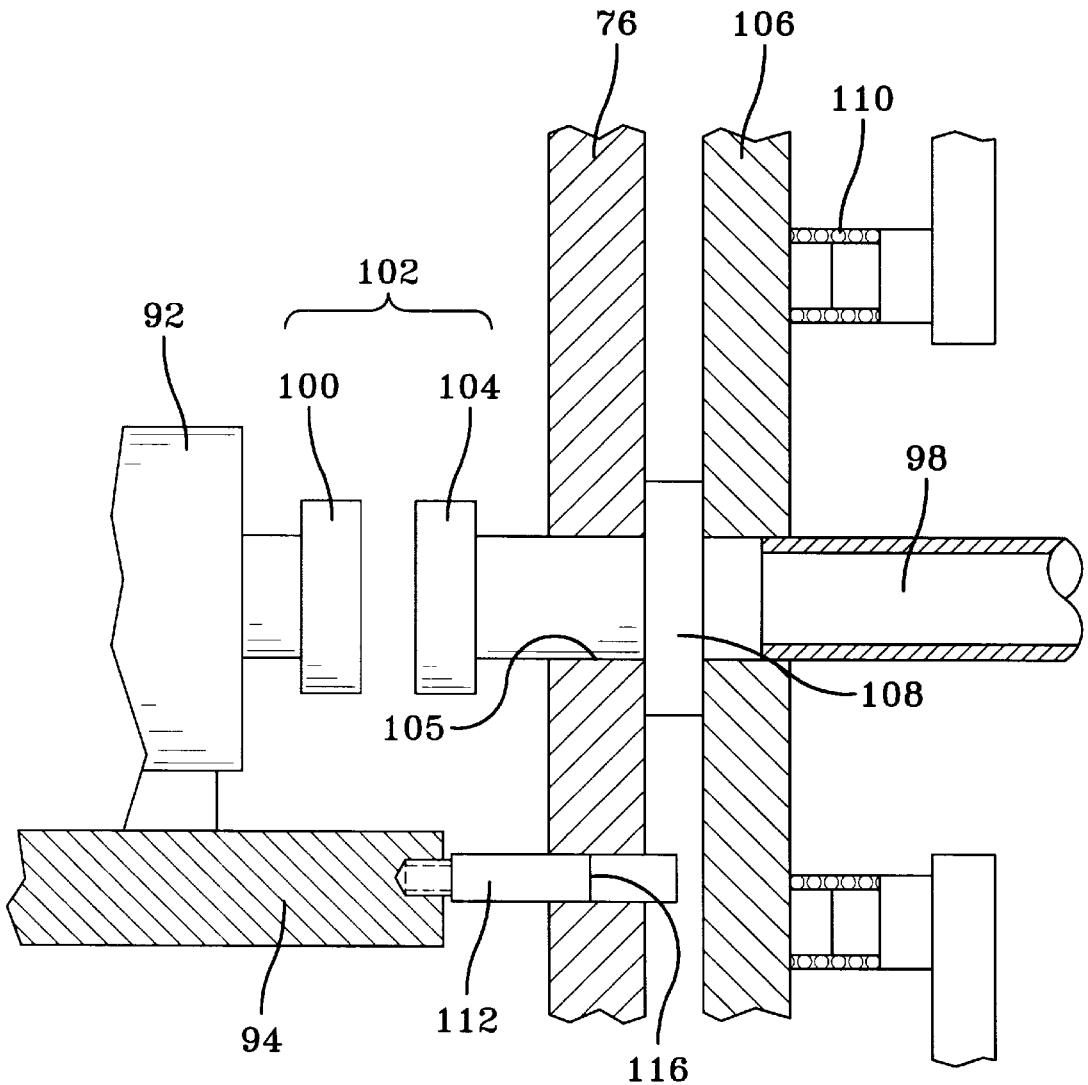
FIG. 5 a schematic side view of a braking device for the locking of a threaded spindle of the handling device.

A brake plate 106, which is only illustrated in FIG. 5 for reasons of clarity, is arranged spaced from the attachment plate 76 and extends parallel to the attachment plate 76. A radially outwardly projecting collar 108 is formed between the two plates 76 and 106 on each threaded spindle 98 and prevents direct contact of the braking plate 106 against the attachment plate 76. The braking plate 106 is displaceably mounted and is biased by a plurality of springs 110 in the direction towards the attachment plate 76. The braking plate 106 can be moved between a braking position, in which it clamps the collar 108 of the threaded spindles arranged between it and the attachment plate 76 between itself and the attachment plate 76, and a release position, in which the braking plate 106 releases the collar 108.

Figure 6:
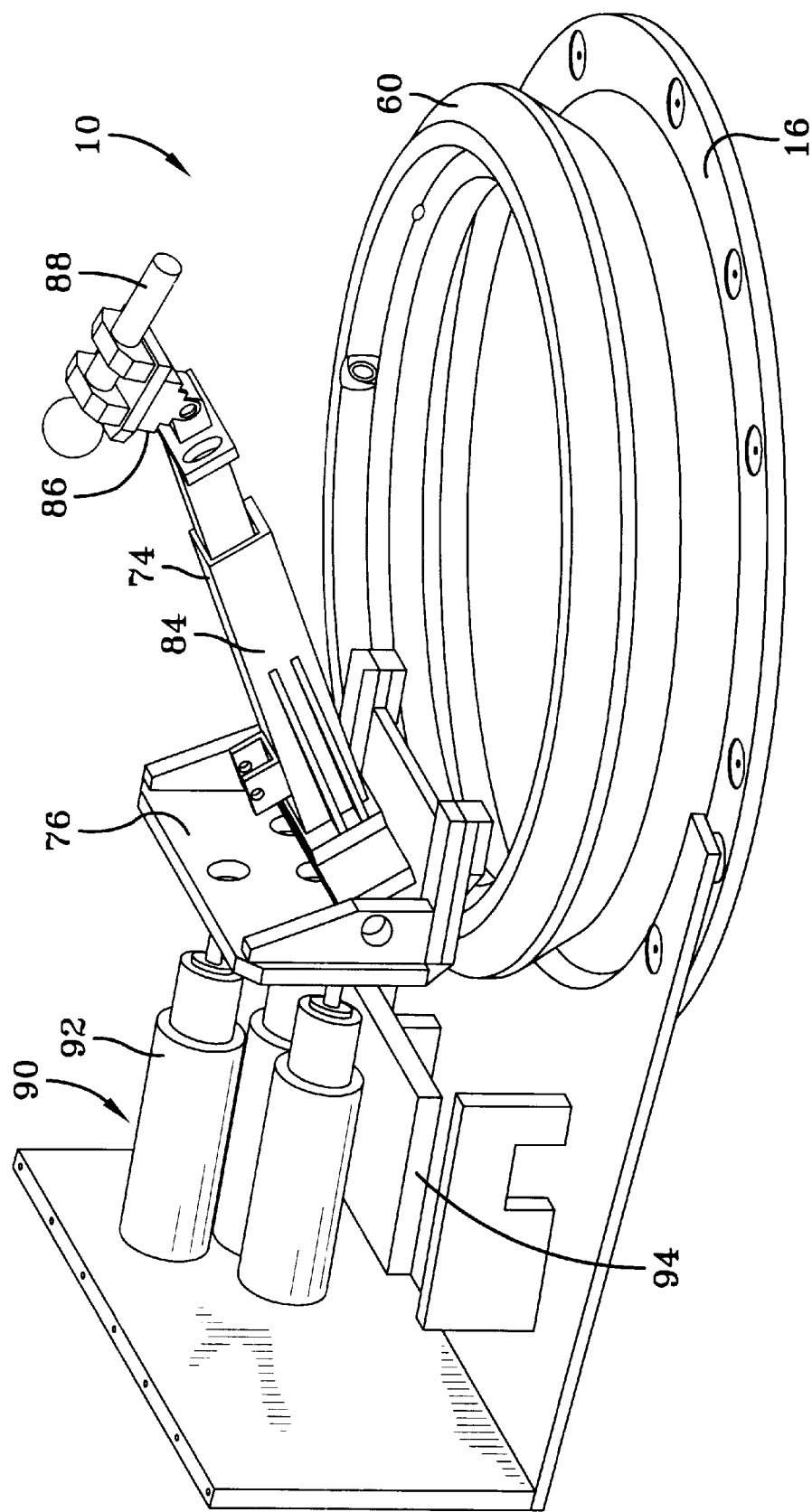
FIG. 6 a perspective illustration of the apparatus of FIG. 4 in which the handling device is shown in a working position.

In order for the braking plate 106 to be moved against the force of the springs 110 into its released position, a pin 112 is secured to the carriage 94 and extends in the direction of the braking plate 106 through a passage bore 114 formed at the attachment plate 76. The pin 112 is so secured to the carriage 94 that its end face comes into contact with the flat side of the braking plate 76 when the carriage 94 is moved from its rest position into its coupling position.

soon as the handling device 74 is to be adjusted, the carriage 94 is moved by a non-illustrated drive from its rest position into its coupling position, with the two coupling elements 100 and 104 of the coupling device 102 first coming into engagement with one another. During the entry into engagement of the coupling elements 100 and 104, the pin 112 of the carriage 94 presses, during the movement of the carriage which is continued into its final coupling position, against the braking plate 106, whereby the braking plate 106 is moved against the force of the springs 110 out of its braking position into its release position. As soon as the carriage 94 has reached its coupling position, the coupling elements 100 and 104 are, on the one hand, coupled to one another in an orderly manner and, on the other hand, the braking plate 106 is moved sufficiently far away from the collars 108 of the threaded spindles 98 that these are now braked by their self-locking characteristics and by the coupling to the servomotors 92, but not, however, by the braking plate 106. Thereafter, the various servomotors 92 are activated which drive the threaded spindles 98 coupled to them, whereby the telescopic arm 84 is extended or retracted and also lifted or lowered, while at the same time the position of the cleaning pistol 88 is changed, as is shown in FIG. 6. After the desired position has been set, the servomotors 92 are stopped and the carriage 94 is moved into its rest position again, in which the coupling elements 100 of the servomotors 92 are decoupled from the coupling elements 104 of the threaded spindles 98. During the movement of the carriage 94 into its rest position, the braking plate 106, which is supported with its flat side against the pin 112 of the carriage 94 is moved by the force of the springs 110 into its braking position again, in which it contacts the collars 108 of the threaded spindles 98 under bias and locks these. As soon as the pin 112 of the carriage 94 no longer contacts the braking plate 106, the coupling elements 100 and 104 of the coupling device 102 come out of engagement, so that the drive means 90 is decoupled from the handling device 74.

Figure 7:
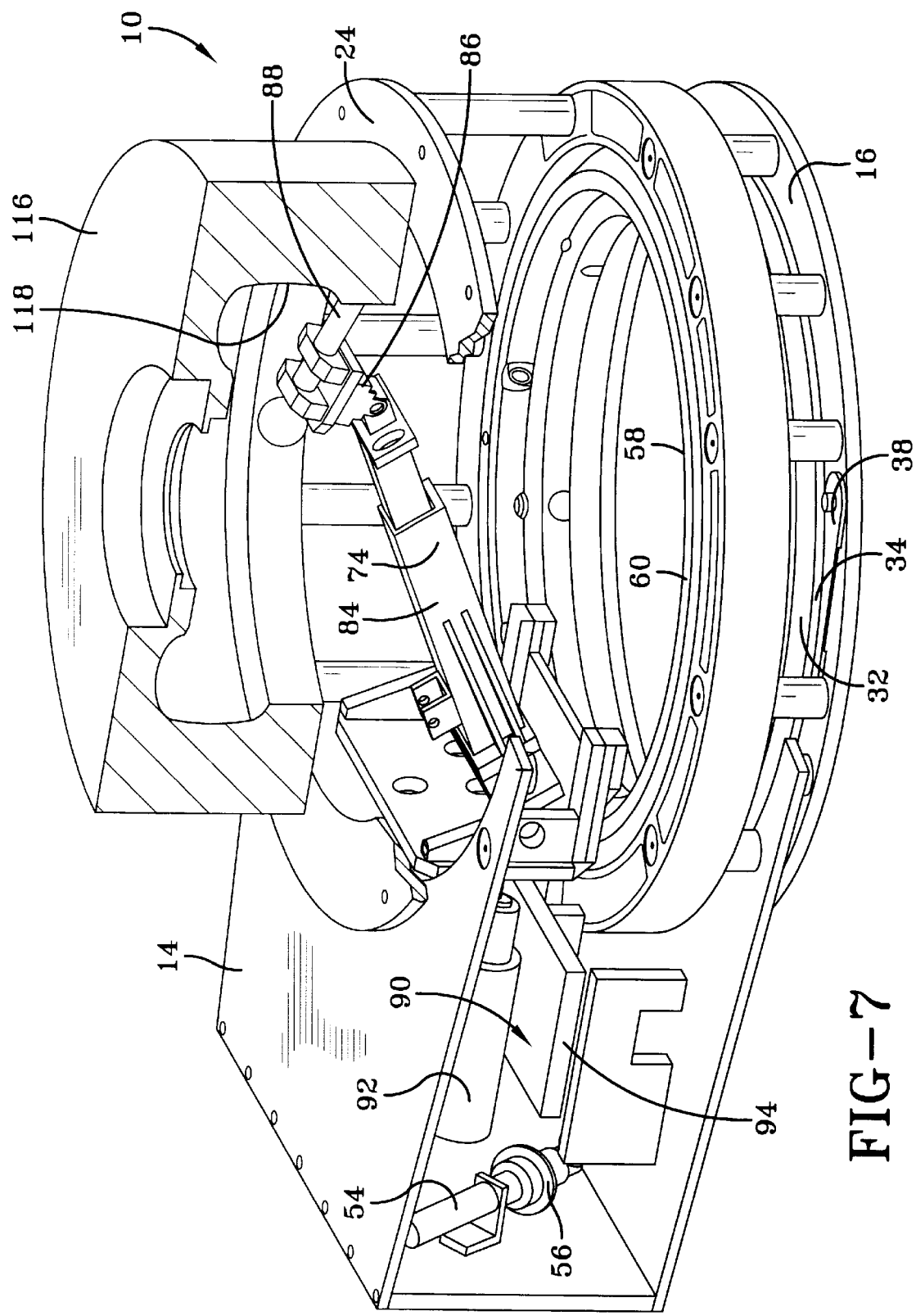
FIG. 7 a perspective illustration of the apparatus of FIG. 1 during the cleaning of the part mold of a vulcanization mold.

In the following the manner of operation of the apparatus 10 is explained in more detail with reference to FIG. 7. As soon as it is established, during tire manufacture, that the vulcanization mold is contaminated to too great a degree, the apparatus 10 comes into use. For this purpose the two part molds of the vulcanization mold, of which only the upper part mold 116 is shown in FIG. 7, are initially moved sufficiently far apart so that the frame 12 of the apparatus 10 can be moved between the two part molds 116 with the aid of the non-illustrated lifting device. Thereafter, the frame 12 is lowered to such an extent that its support ring 16 is supported on the press bed of the vulcanization device. Thereafter, the non-illustrated control of the apparatus 10 activates the air motor 54 of the centering device 32, so that the frame 12 is aligned in the manner described with reference to FIG. 2 at the non-illustrated lower part mold. As soon as the alignment process has been concluded, the part mold 116 shown at the top in FIG. 6 is lowered to such an extent that its lower side comes into contact with the upper side of the contacting ring 24. In this manner the press bed with the lower part mold, the jacketed frame 12 and also the upper part mold 116 forms a cleaning chamber which is closed off towards the outside.

After the frame 12 has been positioned in the above described manner, the drive means 90 is coupled to the handling device in the manner previously described with reference to FIGS. 4 to 6 and the cleaning pistol 88 is moved by activation of the servomotors 92 into a defined position with respect to the mold surface 118 of the vulcanization mold which is to be cleaned. In the example shown in FIG. 7, the cleaning pistol 88 is moved out of its rest position (shown in broken lines) into its working position (shown in continuous lines) in which it is aligned with the mold surface of the upper part mold 116. For the cleaning of the lower part mold the cleaning pistol 88 can be moved through the central opening of the lower support ring 16.

After the positioning of the cleaning pistol 88 has been concluded, which has taken place with the aid of a comparatively simply programmed control program, with which a total of only three axes of the handling device 74 are adjusted, the drive means 90 is decoupled again from the handling device 74, with the braking plate 106 locking the threaded spindles 98 in their selected positions, so that after the decoupling of the drive means 90 the cleaning pistol 88 remains in its desired position.

After the positioning of the cleaning pistol 88, the drive of the rotary mount 58 is switched on, with the cleaning pistol 88 being simultaneously supplied with dry ice pellets which are mixed into a compressed air stream emerging from the cleaning pistol 88. As soon as the dry ice pellets escape from the cleaning pistol 88, the total handling device 74 is rotated with the aid of the rotatable ring 16 moved by the drive motor 17, with the axis of the rotatable ring 60 having previously been aligned with the axis of symmetry of the part mold 116 through the alignment of the frame 12. In this way it is ensured that the cleaning pistol 88 is moved relatively past the mold surface 118 of the part mold 116 at a constant spacing for the cleaning. As soon as the handling device 74 has been moved through a full rotation of 360°, the drive of the rotatable ring 60 is switched off and the dry ice supply is interrupted. Thereafter, the drive means 90 is coupled anew to the handling device 74 and the cleaning pistol 88 is adjusted into a new position. After the setting of the new position, the drive means 90 is decoupled again from the handling device 74, with the braking plate 106 securing the position of the cleaning pistol 88.

Thereafter a new cleaning cycle is commenced, and in this case the rotatable ring 60 moves jointly with the handling device 74 in a direction of rotation which is opposite to the direction of rotation during the immediately preceding cleaning cycle. In this manner a situation is achieved in which the supply lines (not shown) of the cleaning pistol 88 leading to the bearing ring 20 are moved in the one direction during one cleaning cycle and in the opposite direction during the subsequent cleaning cycle so that multiple winding or twisting of the supply lines around the rotatable ring 60 is avoided.

The coupling on and decoupling of the drive means 90 and also the setting of the cleaning pistol 88 and the subsequent rotation of the handling device 74 is repeated until the mold surface 118 of the part mold 116 has been cleaned. Thereafter, the non-illustrated lower mold part of the vulcanization mold can be cleaned in the same manner with the aid of the cleaning pistol 88.

As soon as the cleaning of the vulcanization mold has been concluded, the molds are moved apart from one another, the centering device of the frame 12 is moved back into its starting position again in which the levers 38 are pivoted away from the mold and thereafter the frame 12 is drawn out of the vulcanization device with the aid of the lifting apparatus. In order not to delay the operation of the vulcanization device unnecessarily, it is furthermore proposed that the part molds 116 of the vulcanization mold should also be kept at a temperature in the range of 155 to 160° C. during the cleaning process, so that after the cleaning of the vulcanization mold the manufacture of tires can be continued without interruption or delay for reheating.

We claim:

1. Apparatus for the cleaning and/or coating of a mold surface of a mold, comprising a frame which can be placed onto the mold and in which a handling device is movable along a predetermined track in such a way that at least one cleaning or coating unit is provided on the handling device, of which the relative position is adjustable relative to the mold surface, is moved past the mold surface at a predetermined spacing for the cleaning or coating, and further comprising a drive means for the adjustment of the position of the cleaning or coating unit, wherein the drive means coupled to the handling device for the adjustment of the relative position of the cleaning or coating unit is decoupled from the handling device, at least during the movement of the handling device along the predetermined track, with the cleaning or coating unit retaining its relative position with respect to the mold surface previously set by the drive device.

2. Apparatus in accordance with claim 1, wherein the handling device has a braking unit which locks the cleaning or coating unit in its relative position after adjustment.

3. Apparatus in accordance with claim 2, wherein the handling device has at least one self-locking positioning unit for the adjustment of the relative position of the cleaning or coating unit, the positioning unit being capable of being coupled to the drive means and holding the cleaning or coating unit in its relative position after the adjustment and during the movement of the handling device.

4. Apparatus in accordance with claim 3, wherein the positioning unit has at least one self-locking threaded spindle which is rotatably mounted at a mounting plate of the handling device, and in that the braking unit is a braking plate movable in the longitudinal direction of the threaded spindle between a braking position, in which it clamps a collar projecting radially outwardly from the threaded spindle between itself and the mounting plate, and a released position, in which the brake plate releases the collar.

5. Apparatus in accordance with claim 4, wherein the braking plate is biased by a spring into its braking position and is movable into its release position by the driving means during the coupling to the threaded spindle.

6. Apparatus in accordance with claim 1, wherein the drive means has at least one electrical drive, preferably a servo-motor, the drive shaft of which has a clutch which can be coupled to the handling device.

7. Apparatus in accordance with claim 1, wherein the drive means is held on a carriage which is movable between a rest position in which the drive means is spaced from the handling device and a coupling position in which the drive means is coupled to the handling device.

8. Apparatus in accordance with claim 1, wherein the handling device has an attachment unit by which it is held on a rotating ring which is rotatably mounted in the frame about an axis of rotation, with the axis of rotation coinciding during the cleaning or coating with the axis of symmetry of the preferably rotationally symmetrical mold.

9. Apparatus in accordance with claim 1, wherein the handling device has an attachment unit with which it is led, during the cleaning or coating, in a guide provided on the frame and forming a closed surrounding contour.

10. Apparatus in accordance with claim 8, wherein the handling device has a telescopic arm pivotally mounted at the fastening unit, of which the pivotal position and length is adjustable with the aid of the drive means with the cleaning or coating unit being held at the free end of the telescopic arm remote from the attachment unit.

11. Apparatus in accordance with claim 8, wherein the cleaning or coating unit is pivotally mounted on the handling unit or on the telescopic arm, with the pivotal position of the cleaning or coating unit being adjustable with the aid of the drive means.

12. Apparatus in accordance with claim 1, wherein a centering unit is provided at the frame, with which the frame can be aligned with respect to the mold which is to be cleaned or coated.

13. Apparatus in accordance with claim 12, wherein the centering unit has a centering ring rotatably mounted on the frame and standing in a co-operative connection with at least one lever which is pivotally mounted on the frame such that with one turn of the centering ring in a predetermined first direction relative to the frame, the lever is moved into a centering position in which it comes into contact with the mold and, on rotation of the centering ring in a second direction opposite to the first direction, the lever is movable into a release position in which it is moved away from the mold.

14. Apparatus in accordance with claim 1, wherein the frame has a first ring and a second ring arranged spaced from it, with the two rings being connected to one another concentrically by several spacers arranged spaced apart relative to one another in the peripheral direction, preferably uniformly, and with the handling device being disposed between the rings and the spacers, and in that at least one of the two rings of the frame contacts the mold during the cleaning or coating such that the rings are arranged approximately concentrically to the axis of the symmetry of the rotationally symmetrical mold, with the cleaning or coating unit for the cleaning or coating projecting through the central opening of the relevant ring.

15. Apparatus in accordance with claim 1, wherein a sound absorbing jacket covers the housing, at least partially.

16. Apparatus in accordance with claim 1, wherein the cleaning unit has a dry-ice pistol which serves for the application of dry ice pellets onto the mold surface, or is a laser head for the irradiation of the mold surface.

17. Apparatus in accordance with claim 1, wherein the coating unit has a coating pistol for the spraying of a coating material onto the mold surface.

18. Apparatus in accordance with claim 1, wherein the frame is held on a preferably adjustable lifting device which is used for the placement of the frame onto the mold.

19. Apparatus in accordance with claim 1, wherein the mold is made out of at least two mold parts which are able to move apart in a preferably axial direction, and in that the frame is placed between the moved apart mold segments for the coating or cleaning.

* * * * *